United States Patent [19]
Hiramoto et al.

[11] Patent Number: 5,847,783
[45] Date of Patent: Dec. 8, 1998

[54] LCD WITH ELECTROLUMINESCENT PANEL DRIVE CIRCUITRY MOUNTED TO OPPOSE LCD DRIVE CIRCUITRY

[75] Inventors: Masami Hiramoto, Chofu; Kazuhiro Sugiyama, Kunitachi; Hirokazu Saito; Hideki Nakajima, both of Ome; Akira Igarashi, Iruma; Masaaki Shibamoto, Hino; Katsunobu Sakaishi, Hachioji, all of Japan

[73] Assignee: Casio Computer Co., Ltd., Tokyo, Japan

[21] Appl. No.: 959,757

[22] Filed: Oct. 29, 1997

[51] Int. Cl.$^6$ .................................................. G02F 1/1335
[52] U.S. Cl. .......................... 349/69; 349/149; 349/151; 345/80; 345/102; 345/205
[58] Field of Search ............................ 349/69, 149, 151; 345/80, 102, 205

[56] References Cited

U.S. PATENT DOCUMENTS 5,576,868  11/1996  Togashi ...................................... 359/88
5,670,980  9/1997  Kuga ......................................... 345/102
5,748,270  5/1998  Smith ........................................ 349/69

*Primary Examiner*—William L. Sikes
*Assistant Examiner*—Robert J. Hollingshead
*Attorney, Agent, or Firm*—Frishauf, Holtz, Goodman, Langer & Chick

[57] ABSTRACT

An electroluminescent panel is provided in a region of the rear surface side of the display panel, which corresponds to a display region, and the drive circuit for the display panel is located in the other region than the display region, on the surface side of the display panel. Further, the inverter serving as a drive circuit for the electroluminescent panel is provided in the region of the rear surface side of the display panel, other than the display region. With this structure, the downsizing and thinning of the display device are promoted.

15 Claims, 7 Drawing Sheets

LCD WITH ELECTROLUMINESCENT PANEL DRIVE CIRCUITRY MOUNTED TO OPPOSE LCD DRIVE CIRCUITRY

BACKGROUND OF THE INVENTION

The present invention relates to a display apparatus with a plane-type light source.

Some of the liquid crystal display apparatus, which are not capable of emitting light by themselves, are equipped with an electroluminescent panel (hereinafter referred to as "EL panel") as a plane luminescence type back light, on the rear side of the liquid crystal display panel. In these conventional apparatus, an EL panel and an inverter circuit used as an EL panel driving circuit are equipped as separate parts from the liquid crystal display panel. In other words, the inverter circuit needs to be mounted on the mother board (the main circuit board) of the product.

However, in the case where a conventional liquid crystal display apparatus in which an EL panel is used as a back light, is built as a display apparatus in a product, it becomes very difficult to downsize or thin the product having such a liquid crystal display apparatus, since the inverter for driving the EL panel must be provided on the mother board as separate parts from the display apparatus.

BRIEF SUMMARY OF THE INVENTION

The object of the invention is to provide a downsize and thin the display apparatus, in order to greatly promote the downsizing and thinning of the product in which such a display apparatus is provided.

In order to achieve the above-described object, the display apparatus of the present invention includes: a display panel, having a display region, a front surface, a rear surface and a support region different from the display region, for displaying an image by controlling transmission of light incident on and within the display region, from outside; a drive circuit, provided on a front surface side of the support region of the display panel, for driving the display panel; an EL panel, provided in a region of a rear surface side of the display panel, which corresponds to the display region, for irradiating light on the display region; and a drive circuit, provided on a rear surface side of the support region of the display panel, for driving the EL panel.

With the display apparatus having the abovedescribed structure, the EL panel and the driving circuit are provided on the rear surface side of the display panel, and thus they are provided as a unit integrated to the display apparatus. Therefore, the downsizing and thinning of the apparatus can be achieved. By employing such a display apparatus, it becomes possible to greatly promote the downsizing and thinning of the final product in which the display apparatus is built, such as a mobile telephone, and remarkably improve the efficiency of the assembling of the product.

In the above display apparatus, the driving circuit for driving the EL panel should preferably situated in a region on the rear surface side of the region where the drive circuit for driving the display panel and a wiring circuit connected to this drive circuit, are arranged. With this structure, the display apparatus can be downsized. In this case, an electro-conductive sheet connected to ground, should be interposed at least between the drive circuit for driving the display panel and the drive circuit for driving the EL panel. Thus, the occurrence of a display error resulting from an adverse influence on the drive circuit for the display panel, caused by noise generated from the driving circuit for the EL panel, can be surely prevented.

In the case where the display panel is a liquid crystal panel, it is preferable that the drive circuit for driving the liquid crystal panel should be incorporated directly onto a wiring circuit formed on one of the substrates, which extends out of the display region. In this case, the transparent substrate on which the wiring circuit is formed, may be a glass or film substrate. When a glass substrate is used, the drive circuit is directly mounted by the COG mounting method, whereas a film substrate is used, it is directly mounted by the COF mounting method.

Further, in the display apparatus, it is preferable that the luminescence region of the EL panel should be attached to the entire rear surface of the display region of the display panel via an adhesive. In this case, when an appropriate pigment is mixed and dispersed in the adhesive, the color of the light output from the EL panel can be adjusted to a desired one, and made incident on the display panel.

Furthermore, in the display apparatus, it is preferable that the drive circuit for the display panel and the drive circuit for the EL panel should be connected to a common input wiring circuit. When the common input wiring circuit is a flexible printed circuit, it would be further preferable for the mounting of the circuits.

The display apparatus may be remodeled into a semi-transmission reflection type, by providing a semi-transmission reflection film between the display panel and the EL panel.

Additionally, in the display apparatus, it is possible that the drive circuit for the electroluminescent panel is incorporated directly onto the wiring circuit for connecting the EL panel. In this case, it is preferable that the connection wiring circuit should be a flexible printed circuit, so as to further promote the downsizing and thinning of the display apparatus.

The object can be achieved by the display apparatus of the present invention which includes: a display panel having a predetermined display region, and displaying an image by controlling transmission of light incident on and within the display region, from outside; a drive circuit, provided in an region other than the display region, on a front surface side of the display panel, for driving the display panel; a plane-type light source, provided in a region corresponding to the display region, on a rear surface side of the display panel, for irradiating light uniformly on the display region; and a drive circuit, provided in a region corresponding to the region other than the display region, on the rear surface side of the display panel, for driving the plane-type light source.

In the just-described display apparatus, the plane-type light source and its driving circuit are provided on the rear surface side of the display panel, so as to reduce the size and thin the display apparatus as a unit. Therefore, it becomes possible to greatly promote the downsizing and thinning of the final product in which the display apparatus is built, and remarkably improve the efficiency of the assembling of the product.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described in detail with reference to accompanying drawings.

Figure 1:
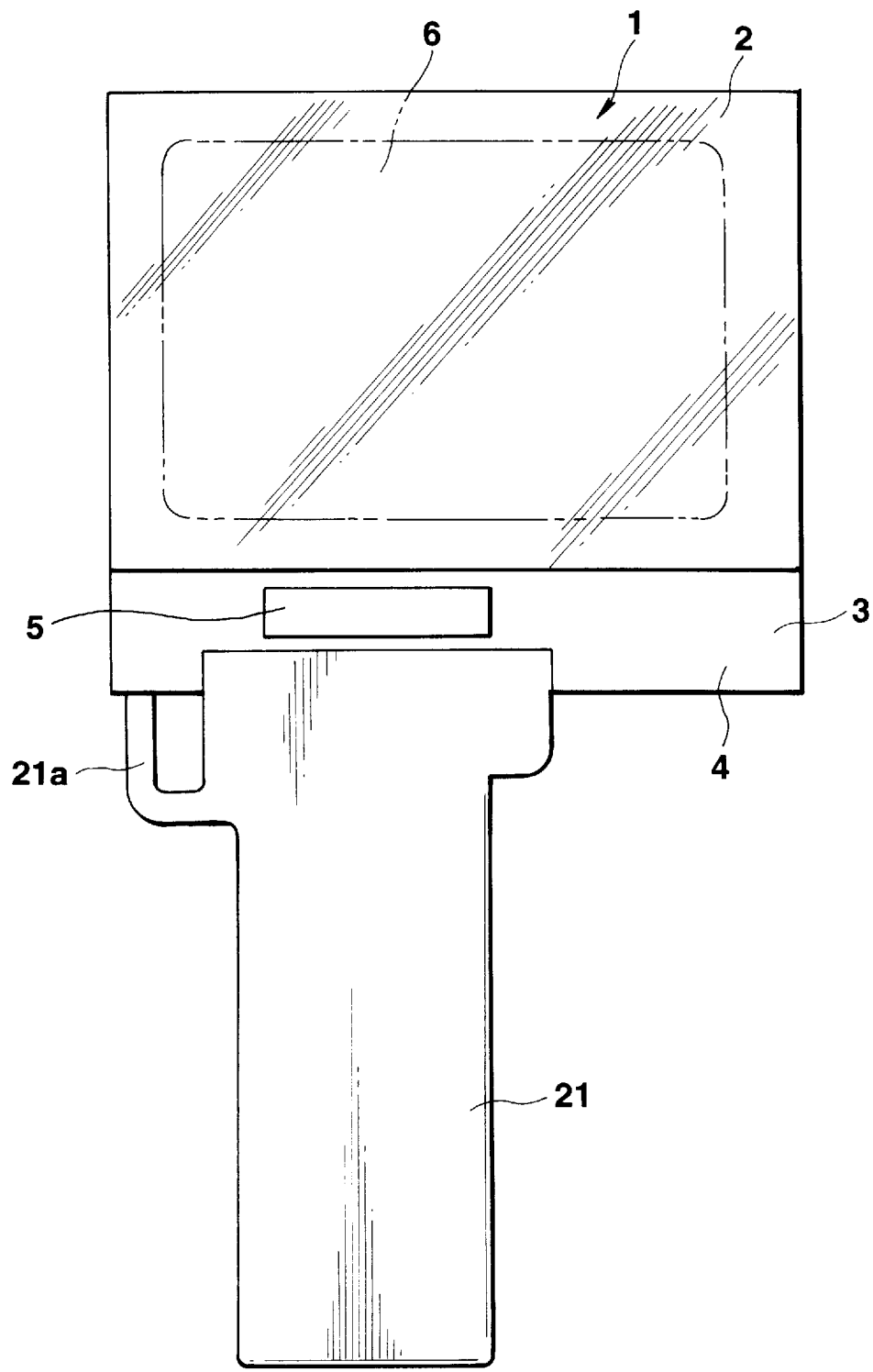
FIG. 1 is a front plan view of a liquid crystal display apparatus according to an embodiment of the present invention.

As shown in FIG. 1, the liquid crystal display apparatus includes a liquid crystal display panel 1. The liquid crystal display panel 1 has a structure in which liquid crystal (not shown) is sealed between two transparent substrates 2 and 3 each made of a glass plate, a resin film or the like. In this structure, a projecting portion 4 of the transparent substrate 3 which is on the rear side, extends out from the lower edge of the transpatent substrate 2 on the front side. A semiconductor chip 5 such as LSI chip, serving as a display panel driving circuit, is directly mounted on the front surface of the projecting portion 4 by COG (chip on glass) or COF (chip on film) mounting method.

Figure 2:
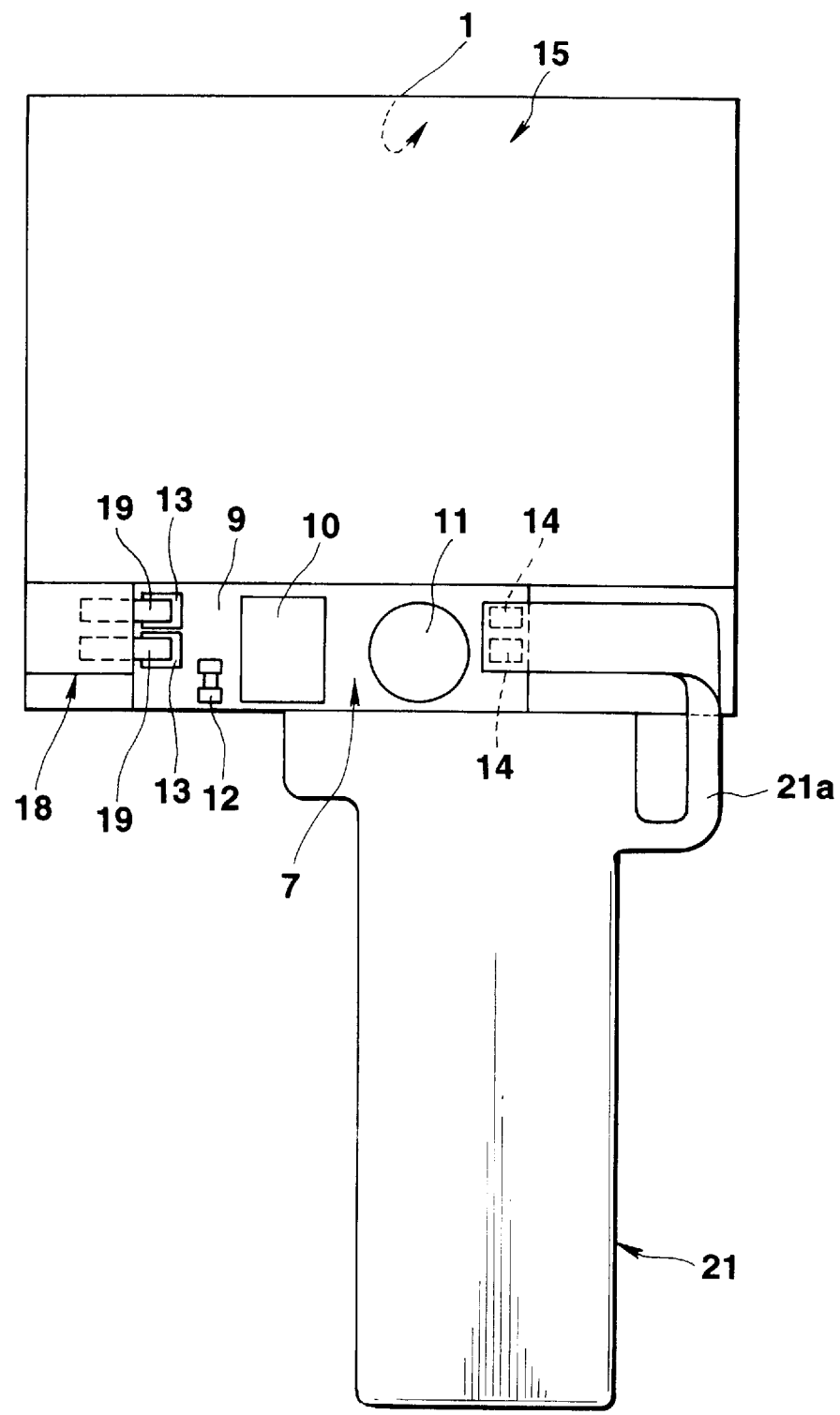
FIG. 2 is a rear plan view of the liquid crystal display apparatus shown in FIG. 1.
Figure 3:
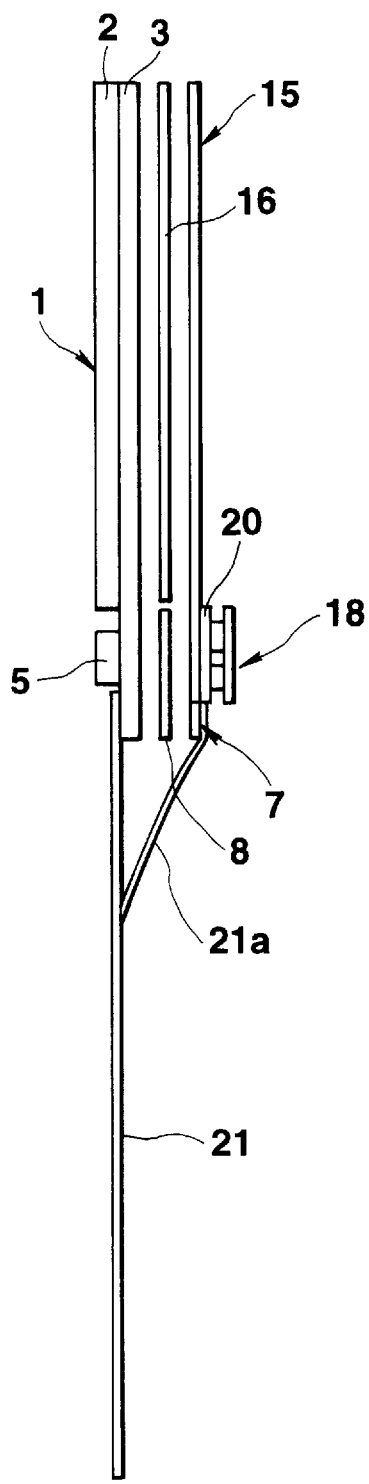
FIG. 3 is an exploded side view of the liquid crystal display apparatus shown in FIG. 1.

An inverter 7 as an EL panel drive circuit is adhered via an adhesive, to a region of the rear surface side of the liquid crystal display panel 1, which corresponds to the projecting portion 4, that is, the rear surface side of the projecting portion 4, as can be seen in FIGS. 2 and 3. The inverter 7 is a device for converting a direct current power into an alternating current power (about 200 V), and has a structure in which an EL panel driving semiconductor chip 10, an inductor 11 and a capacitor 12 are mounted on a printed circuit board 9. Further, a pair of connecting terminals 13 electrically connected to an EL panel, which will be explained later, are provided to an end portion of the printed circuit board 9, and a pair of connecting terminals 14 connected to a FPC (flexible printed circuit) film 21 are provided to another end portion of the board 9.

An EL panel 15 is adhered via an adhesive 16 to a portion of the rear surface side of the liquid crystal display panel 1, which corresponds to the display region 6 of the panel 1. In this case, the entire front surface of the EL panel 15 is adhered to the liquid crystal display panel 1 via the adhesive 16 which transmits light. In this embodiment, a pigment is mixed and dispersed in the adhesive 16. The pigment is mixed such as to adjust the color of the light emitted from the EL panel, to a desired one, and make it incident on the liquid crystal display panel 1.

Figure 4:
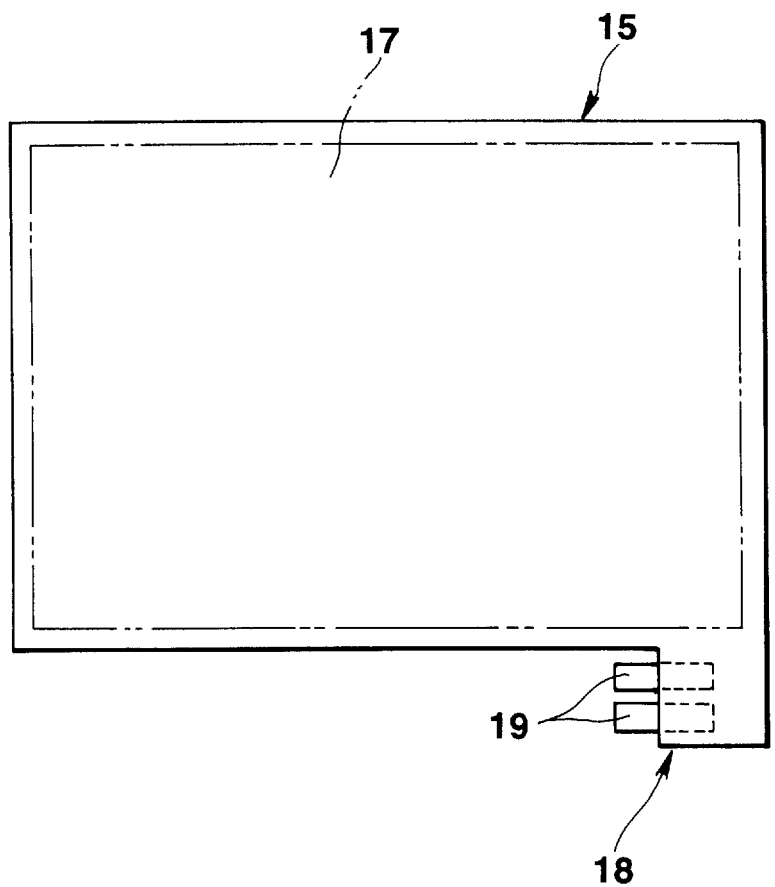
FIG. 4 is a front plan view of an EL panel in the liquid crystal apparatus shown in FIG. 1.
Figure 5:
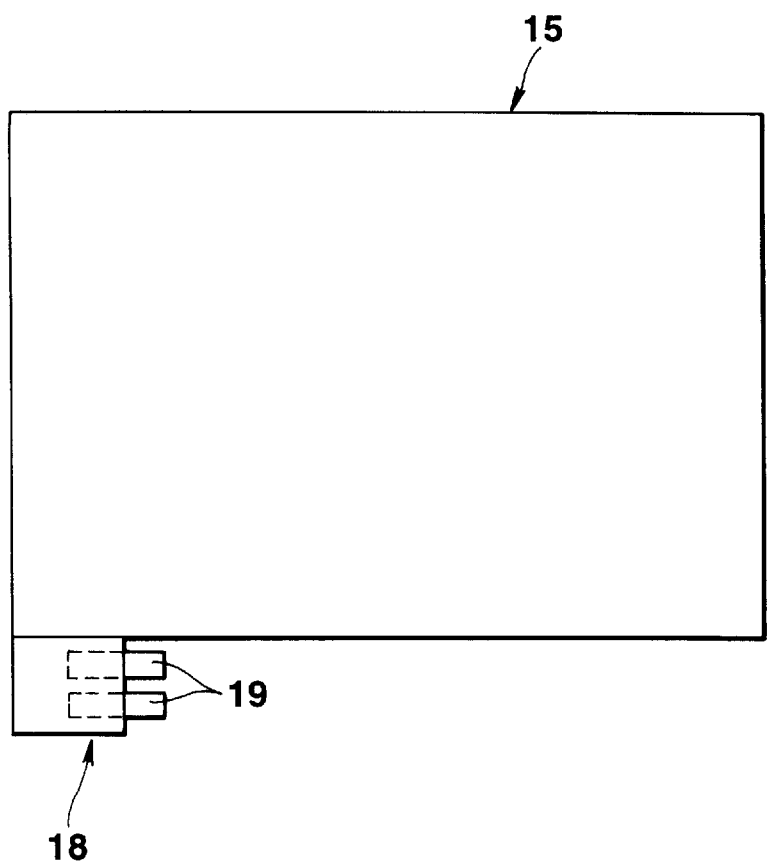
FIG. 5 is a rear plan view of the EL panel shown in FIG. 4.
Figure 6:
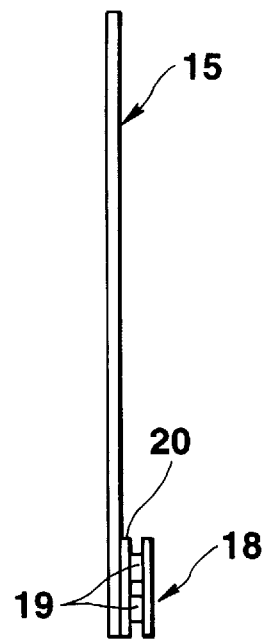
FIG. 6 is a side view of the EL panel shown in FIG. 4.
Figure 7:
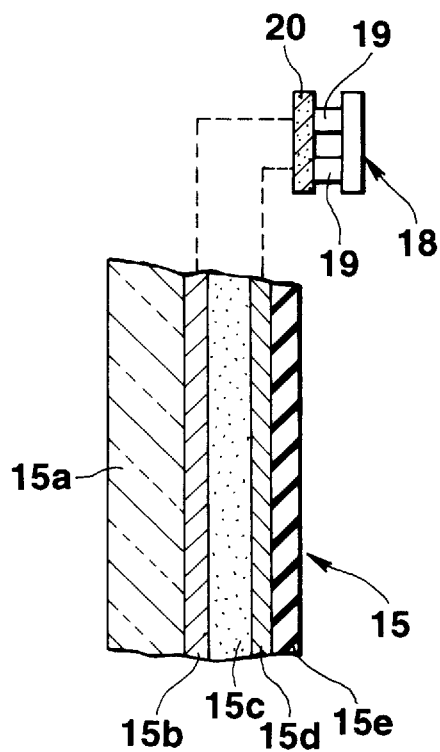
FIG. 7 is a sectional view of the EL panel shown in FIG. 4.

FIG. 4 is a front plan view of the EL panel 15, FIG. 5 is a rear plan view of the EL panel 15, FIG. 6 is a side view of the EL panel 15, and FIG. 7 is a cross sectional view showing the structure of the EL panel. The EL panel 15 has a structure such as shown in FIG. 7. That is, a transparent electrode 15b made of ITO or the like, is provided on the rear surface of a transparent flexible film substrate 15a made of PET (polyethylenetelephthalate) or the like, and an electroluminescent layer 15c made by mixing and dispersing fine powder of phosphor in a dielectric material provided on the rear surface of the transparent electrode 15b. Further, an insulation protection film 15e is provided on the rear surface of a back electrode 15d made of for example carbon, which is attached on the rear surface of the electroluminescent layer 15c. The EL panel 15 has a light-emitting region 17 on its front surface, which is indicated by the two-dot chain line in FIG. 4, and a connecting portion 18 on its lower right section. The transparent electrode 15b and the back electrode 15d are drawn to the connecting portion 18, and further a pair of connecting pins 19 connected to the pair of connecting terminals 13 of the inverter 7, are provided for the connecting portion 18. Thus, the pair of connecting pins 19 are connected to be electro-conductive to drawn terminal portions of the transparent electrode 15b and the back electrode 15d via an anisotropic conductive adhesive 20.

As shown in FIG. 1, an end portion of an FPC film 21 is connected to the front surface of the projecting portion 4 of the liquid crystal panel 1. The FPC film 21 has a branch portion 21a which branches off from the middle of the film. A middle portion of the branch portion 21 is twisted by about 180 degree and turned by about 90 degree so that its distal end portion is connected to the connecting terminals 14 of the inverter 7, as can be seen in FIG. 2.

As described above, the liquid crystal display apparatus of the embodiment, that is, the liquid display module including the liquid crystal display panel, the back light and the drive circuits therefor, has the following structure. That is, the EL panel 15 serving as a back light is attached to a region of the rear surface side of the liquid crystal display panel, which corresponds to the display region 6, and the inverter 7 serving as a drive circuit for the EL panel 15 is provided on a region of the rear surface side of the substrate's projecting portion 4, other than the display region 6 of the liquid crystal panel 1. Further, the semiconductor chip 5 serving as a drive circuit for the liquid crystal display panel 1 is directed mounted on the other region of the front surface side of the liquid crystal panel 1, than the display region 6, that is, the front surface side of the projecting portion 4 of the transparent substrate 3. With this structure, the downsizing and thinning of the liquid crystal module as a whole is remarkably promoted. With the liquid crystal display module, the mounting of the EL-panel-equipped liquid crystal display module, can be extremely facilitated, and the downsizing and thinning of the final product in which such a liquid crystal display module is provided, is greatly promoted, as compared to the conventional case where the inverter 7 for driving the EL panel is built in a mother board, as a separate unit from the liquid crystal display module.

The entire liquid crystal display apparatus can be further thinned when the transparent substrates 2 and 3 are made of resin film.

Further, since the entire surface of the EL panel 15 is adhered to the display panel 1 via the adhesive 16, fine vibrations which occur when the EL panel 15 emits light are absorbed by the adhesive, thus making it possible to reduce the occurrence of abnormal noise sound.

Furthermore, since a pigment used for adjusting the color of display, is mixed and dispersed in the adhesive 16 for adhering the EL panel 15 to the rear surface of the display panel 1, it is possible to obtain a desired display color which is different from the color of the light emitted from the EL panel 15.

As an alternative to the pigment mixed into the adhesive, it is possible that a pigment layer serving as a color tone adjusting layer for creating a desired display color, is formed on the surface of the flexible film substrate 15a or on the transparent electrode 15b formed on the rear surface of the substrate 15a, in the EL panel 15 shown in FIG. 7, by a printing method or the like. In this case, when a partial region is selected for forming the pigment layer, the display color can be regionally varied. Further, when pigment layers are formed selectively in several regions such that the pigments layers differs from each other in color, the variation of colors to be displayed can be further widened. It should be noted that, in the case where the pigment is added directly to the EL layer 15c, the color, in some cases, changes along with time elapse, whereas in the case where the pigment is mixed into the adhesive or the pigment layer is formed by printing on the film substrate 15a, the change in the display color, resulting along with time, can be suppressed.

In the above embodiment, the print circuit board 9 of the inverter 7 is formed as a separate unit from the FPC film 21; however they may be formed as an integrated unit. With the integrated unit, the number of parts can be reduced, and the circuit board can be directly connected to the EL panel 15, making it possible to omit the connecting pins 19. Further, when the drive circuits for the inverter and the like, are directly mounted (by COF method) on the FPC film, the assembling can be further facilitated and the size of the product can be further reduced.

In the above embodiment, the present invention is applied to a liquid crystal display apparatus; however it can be applied to other display apparatus.

The display apparatus of the present invention is not limited to the transmission type such as of the above embodiment, where the display is carried out always by the light emitted from a plane-type light source such as an EL panel. As a different version, the present invention can be formed into a semi-transmission reflection display apparatus, in which a semi-transmission reflection film is interposed between the display panel and the plane-type light source. In this type, in a bright place, the plane-type light source is turned off, and the display is carried out by reflecting externally incident light on the semi-transmission reflection film, whereas in a dark place, the plane-type light source is turned on, and the display is carried out by the emitted light from the source.

Further, the present invention can be appropriately utilized in the case where other plane-type light source than the EL panel is used, that is, for example, a light source unit in which a cathode ray tube is arranged on the lateral portion of a light-guide plate, is used.

Figure 8:
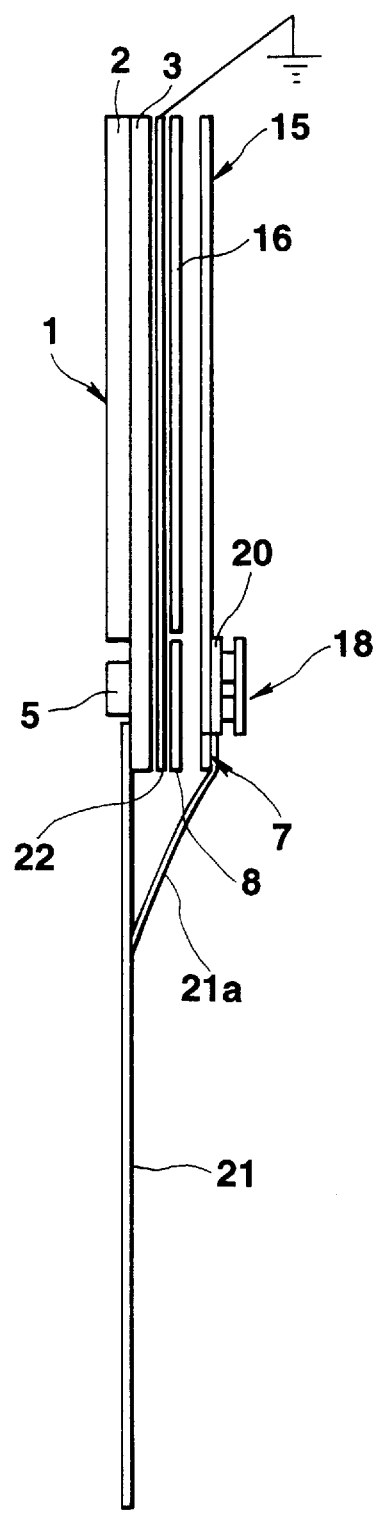
FIG. 8 is an exploded side view of a modification of the embodiment shown in FIG. 3.

In addition, an electro-conductive sheet connected to ground may be provided between the display panel driving circuit and the drive circuit for the plane-type light source. For example, as can be seen in FIG. 8 which illustrates a different version of the above embodiment, it is possible that a transparent conductive sheet 22 made of ITO or the like which is connected to ground, is attached on the rear surface of the liquid crystal display panel 1, and the EL panel 15 and the printed circuit board 9 on which the inverter circuit 7 for driving the EL panel 15 is mounted, are attached to the sheet 22 via adhesives 8 and 16. With this structure, it becomes possible to surely prevent the problem due to a display error resulting from an adverse influence on the display panel driving circuit, caused by noise generated from the drive circuit for the plane-type light source. It should be noted that the conductive sheet 22 of the different version shown in FIG. 8, does not have to be applied on the entire rear surface of the display panel 1, but it may be applied only a region of the rear surface, on which the printed circuit board of the EL panel 15 is adhered.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A display apparatus comprising:
   a display panel, having a display region, a front surface, a rear surface and a support region different from the display region, for displaying an image by controlling transmission of light incident on and within the display region, from outside;
   a first drive circuit, provided on a front surface side of said support region of said display panel, for driving said display panel;
   an electroluminescent panel, provided in a region of a rear surface side of said display panel, which corresponds to said display region, for irradiating light on the display region; and
   a second drive circuit, provided on a rear surface side of said support region of said display panel, for driving said electroluminescent panel.

2. A display apparatus according to claim 1, further comprising a wiring circuit connected to said first drive circuit, said second drive circuit for driving said electroluminescent panel being arranged to substantially oppose to said first drive circuit for driving said display panel and said wiring circuit.

3. A display apparatus according to claim 2, further comprising a conductive sheet connected to ground, interposed between at least said second drive circuit for driving said electroluminescent panel and said first drive circuit for driving said display panel.

4. A display apparatus according to claim 2, wherein said display panel is a liquid crystal display panel formed by sealing liquid crystal between a pair of transparent substrates.

5. A display apparatus according to claim 4, wherein one of said pair of substrates includes said support region, on which said wiring circuit is formed, and said first drive circuit for driving said liquid display panel is directly mounted on said wiring circuit.

6. A display apparatus according to claim 5, wherein said transparent substrates of said liquid crystal display panel comprise flexible resin film substrates.

7. A display apparatus according to claim 5, wherein said transparent substrates of said liquid crystal display panel comprise glass substrates.

8. A display apparatus according to claim 1, wherein said electroluminescent panel has a light emitting region adhered to an entire area of the display region of said display panel via an adhesive.

9. A display apparatus according to claim 8, wherein a pigment is mixed and dispersed in said adhesive.

10. A display apparatus according to claim 1, further comprising an input wiring circuit to which said first drive circuit for driving said display panel and said second drive circuit for driving said electroluminescent panel are commonly connected.

11. A display apparatus according to claim 10, wherein said input wiring circuit comprises a flexible printed circuit.

12. A display apparatus according to claim 1, further comprising a semi-transmission reflecting film provided between said display panel and said electroluminescent panel.

13. A display apparatus according to claim 1, further comprising an electroluminescent panel connecting wiring circuit, on which said second drive circuit for driving said electroluminescent is directly mounted.

14. A display apparatus according to claim 13, wherein said connecting wiring circuit comprises a flexible printed circuit.

15. A display apparatus comprising:

a display panel having a display region, and displaying an image by controlling transmission of light incident on and within the display region, from outside;

a first drive circuit, provided in a region other than the display region, on a front surface side of the display panel, for driving the display panel;

a plane-type light source, provided in a region corresponding to the display region, on a rear surface side of the display panel, for irradiating light uniformly on the display region; and a second drive circuit, provided in a region corresponding to said region other than the display region, on the rear surface side of the display panel, for driving the plane-type light source.

* * * * *